United States Patent [19]

Rose

[11] Patent Number: 4,763,252

[45] Date of Patent: Aug. 9, 1988

[54] COMPUTER ENTRY SYSTEM FOR PREDETERMINED TEXT DATA SEQUENCES

[76] Inventor: David K. Rose, 5-2 Shinsen, No. 304, Shibuya-ku, Tokyo 150, Japan

[21] Appl. No.: 714,443

[22] Filed: Mar. 21, 1985

[51] Int. Cl.$^4$ .................. G06F 3/023; G06F 13/12
[52] U.S. Cl. ............................. 364/200; 340/365 VL
[58] Field of Search ... 364/200 MS File, 900 MS File, 364/709; 340/365 VL, 365 R

[56] References Cited

U.S. PATENT DOCUMENTS

| | | | |
|---|---|---|---|
| 3,706,973 | 12/1972 | Acquadro et al. | 364/900 |
| 4,042,777 | 8/1977 | Bequaert et al. | 340/365 R |
| 4,200,913 | 4/1980 | Kuhar et al. | 364/900 |
| 4,202,041 | 5/1980 | Kaplow et al. | 364/900 |
| 4,250,560 | 2/1981 | Dethloff et al. | 364/900 |
| 4,396,992 | 8/1983 | Hayashi et al. | 364/900 |

FOREIGN PATENT DOCUMENTS 55-112671 8/1980 Japan .

OTHER PUBLICATIONS

Arellano A. and Marcar H.; "Word Generation System for Typist," IBM Technical Disclosure Bulletin; vol. 17, No. 8, Jan. 1975, pp. 2422-2423.
Zbrozek B.; "Keyboard Redefinition" IBM Technical Disclosure Bulletin; vol. 22, No. 5, Oct. 1979, pp. 1957-1958.
Fountain A. M. and Hydes A. F.; "Programmable Function Keys for Display System", IBM Technical Disclosure Bulletin; vol. 23, No. 9, Feb. 1981, p. 4326.
Rose D. and Rose E.; "Prokey User's Guide", copyright 1982 by Rosesoft; pp. 1-35 and additional advertising.

*Primary Examiner*—Gary V. Harkcom
*Assistant Examiner*—David L. Clark
*Attorney, Agent, or Firm*—Leonard Tachner

[57] ABSTRACT

An apparatus for facilitating entry of pre-defined sequences of data characters into a computer or computer-controlled system, and preferably connected between the computer and its keyboard. Each data sequence is identified by a multi-character alphanumeric code name assigned by the user. The apparatus accepts and stores the code names and corresponding data sequences in a self-contained memory, and subsequently accepts a code name from the computer's keyboard, retrieves the corresponding data sequence, and transmits the data sequence to the computer system as if the data sequence had been manually entered in full using the computer system's keyboard. The apparatus can be set to match the characteristics of the transmission link between the computer and its keyboard, and the rate at which each data sequence is transmitted can be adjusted to automatically accommodate the ability of the computer system and its programs to accept and process data.

6 Claims, 6 Drawing Sheets

COMPUTER ENTRY SYSTEM FOR PREDETERMINED TEXT DATA SEQUENCES

BACKGROUND OF THE INVENTION

1. Field of the Invention

The present invention relates generally to computer peripheral equipment and more specifically, to an auxiliary device that facilitates the manual entry of frequently used information into a computer or computer-controlled system.

2. Prior Art

The present invention may be readily distinguished from the known prior art which consists for the most part of the following:

Function keys built into a terminal or computer keyboard where each key generates a fixed code sequence each time it is depressed.

Programmable function keys built into a terminal or computer keyboard where each key generates a user-defined code each time it is depressed.

Non-volatile programmable function keys wherein user-defined code sequences are retained by battery-powered non-volatile memory in the terminal.

Computer software-controlled programmable function keys in which a fixed code generated by each function key on the terminal or computer keyboard is compared to a table of key definitions to initiate the desired character sequence for that key. The intercept program and character sequence table are in the computer memory.

Computer software-controlled keys ("soft" keys) in which the user can allow each key on the keyboard to retain its normal character identity or can reprogram any key to represent a different character or string of characters. When a key is depressed, the computer's operating system or an application program determines whether the standard character code is to be accepted. If it is not to be accepted, the pre-defined character(s) are entered according to a table contained in the computer's memory.

There are several significant disadvantages of function keys on a terminal, a keyboard with programmable function or "soft" keys and programs which intercept keyboard inputs in order to generate pre-defined character sequences. For example, programmable function keys are usually available only on expensive terminals, thus requiring a significantly increased investment by the user in order to obtain programmable function keys. Furthermore, terminals with function keys generally allow only a small number of sequences to be programmed, typically in the range of 10 to 32. Typically, programmable function keys with code storage in the terminal accept a very limited number of characters. For example, one popular terminal provides a total of 256 characters for its 22 function keys. Most prior art terminals with function keys require character sequences to be manually entered each time the terminal is turned on or alternatively, require the generation of an assembly language program or configuration program to store the sequences. Prior art "soft" keys for which the user defines the character sequence for any specific key on the keyboard, are limited to the number of keys on the keyboard and the intrinsic function of each key is lost when it is assigned a sequence. Furthermore, prior art "computer software-controlled" keys require the use of the computer's memory for the interception program and for the storage of the character sequences, thereby reducing the amount of memory available for other programs and data.

The use of "soft" keys and fixed-code keys of the prior art can slow internal operations because the computer must intercept and process each character as it is received to determine whether it is to generate a code sequence.

Prior art separate function key units and configuration programs are usable only with specific brands of popular microcomputers or terminals and therefore are not adaptable to a wide range of terminal/computer combinations. 248 character sequences of up to 8 characters each are programmed into one such computer-specific unit at the factory, or in certain models, can be individually reprogrammed through keys on the unit.

Prior art non-volatile function key embodiments employ either a factory-programmed read-only memory (PROM) or a battery to maintain power for the retention of character sequences in the unit's memory.

SUMMARY OF THE INVENTION

The present invention comprises a small auxiliary device that facilitates manual entry of frequently used information into a computer system with fewer keystrokes, fewer errors, faster access, faster entry and automatic formatting. In one typical embodiment the invention may be used with virtually any terminal incorporating the common RS232 type interface and ASCII character format to allow the user to enter a pre-defined sequence of characters into a computer by entering a simplified code name rather than typing the entire sequence on the keyboard. In one embodiment, the invention accepts any number of sequences comprising a combined total of up to approximately 60,000 characters. (A 2-character alphanumeric code name would allow specification of up to 1,296 sequences). A word processing or text editing program is used to form the desired character sequences. Each sequence can be any length and combination of characters. These sequences, totaling up to approximately 60,000 characters, are combined into a character sequence file. Multiple files can be created and files can be merged or edited for different applications. The files are stored on a magnetic tape or diskette for future and repeated use. The user loads the desired file into the present invention with a procedure similar to that for displaying the contents of a text file on the screen. This file of character sequences is retained in the invention until power is removed or a different file is loaded. When the user keys a specific simple character code name into the invention, the invention automatically sends the entire corresponding character sequence to the computer as if it had been typed by means of the computer's or terminal's keyboard. Typical applications for the invention include word processing operations such as the entry of names and addresses and standard text, data entry such as part names, customer and supplier codes, form generation, programming such as instructions, macrostatements and complex functions, and operational commands to the computer.

Several different embodiments are contemplated. By way of example, one embodiment consists of a "terminal" model to be used in systems in which the keyboard, display and associated circuitry comprises an integrated terminal separate from the computer. Different embodiments of the invention may also be used with computers which include a keyboard as an integral part of the computer unit, and it may also be added to the "normal" keyboard and display circuitry in a terminal by employing different interface circuitry. Further embodiments may be applied to word processing systems, electronic typewriters and to data input devices for the "automatic" generation of information associated with part names or numbers.

As a result of the present invention there are significant improvements relating to the entry of frequently used data into computer systems. For example, there are fewer keystrokes and thus fewer errors. Once the file of character sequences has been created and checked, the invention will "type" the same data every time it is used. In addition, the present invention permits faster access to data for entry into the computer. Much larger quantities of character sequences and longer character sequences can be stored in the present invention's memory than in prior art devices. The invention eliminates the time required to look up or recreate data each time it is to be entered. The invention also provides a solution to a significant disadvantage of prior art function keys and "soft" keys, namely, the use of computer memory which is preferably used for other purposes, and it releases the entire keyboard for normal functions. The invention can, if desired, be used in addition to existing function keys or "soft" key installations, thereby maintaining all of the user's existing programs and procedures plus incorporating the advantages of the present invention.

The present invention also permits faster entry of data. The invention can send data at the highest speed at which the computer and program can accept keyboard entries. Depending upon the speed of the computer and the program receiving the data, the invention can "type" at a rate far exceeding 1,000 words per minute. Another significant advantage of the present invention is text or data formatting. The strings of characters to be entered by the invention can contain tabbing, spacing and carriage return/line feed commands for standard formats such as those used for correspondence, salutations and envelopes, form generation, and for data entry. In addition to normal alphanumeric and punctuation characters, ASCII-standard control characters for the program receiving data can be included in the character sequences.

One illustrative embodiment of the present invention described hereinafter in more detail, comprises a means for accepting sequence files and sequence selection code names, a microprocessor, read-only memory, random access memory, interface circuitry, timing and control circuitry, control switches and power supply. These components are mounted on printed circuit board(s) housed in a case approximately 5×10×3 inches in dimensions. Read-only memory is used for program storage and random access memory is used for storage of the character sequence file, accommodating approximately 60,000 characters.

A flexible signal cable connects the invention to the terminal and/or computer. The invention may be powered from a self-contained power supply or from the computer itself depending upon the nature of the computer with which the present invention is used. Typically, no modification of components is required within the computer or terminal with which the invention is used and no soldering is required for its installation.

In an embodiment illustrated herein, the invention is connected between a computer and a terminal, replacing the passive cable that would normally connect the terminal to the computer. It is believed that the utilization of a "data generating" device (which enters user-desired data as contrasted with devices or schemes which add data only for the assurance of transmission integrity) as an interface between a terminal and computer represents a particularly novel feature of the present invention.

OBJECTS OF THE INVENTION

It is therefore a principal object of the present invention to provide a character sequence generator for facilitating entry of pre-defined data into a computer system or computer-controlled system and which overcomes or significantly reduces the noted disadvantages of the prior art.

It is an additional object of the present invention to provide a unit for accepting and storing pre-defined sequences of data within a memory storage device, each such sequence being addressable by a simple one-to-five character alphanumeric code name, and also to provide means for accepting each such alphanumeric code name and for reading each such corresponding pre-defined sequence at its location in the memory storage device and for transmitting each such pre-defined data sequence to a computer system in response to the selected alphanumeric code name as if each such data sequence had been manually entered in full using the system's keyboard.

It is still an additional object of the present invention to provide a character sequence "generator" in the form of a small auxiliary device that facilitates manual entry of frequently use pre-defined information into a computer system with fewer keystrokes, fewer errors, faster access, faster entry and automatic formatting, and which may be used to allow a user to enter a pre-defined sequence of characters into a computer by pressing a simplified key code rather than typing the entire sequence on the keyboard.

It is still an additional object of the present invention to provide a character sequence "generator" that is connected between a computer and a terminal replacing the passive cable that would normally connect the terminal to the computer and which comprises means for accepting pre-defined sequence files and sequence selection code names, a microprocessor, a read-only memory, a random access memory, interface circuitry and timing and control circuitry, control switches, all mounted on a printed circuit board housed in a case approximately 5×10×3 inches in dimensions and which accommodates approximately 60,000 characters of character sequence data which, depending upon the speed of the computer and the program receiving the data, allows the user to, in effect, "type" such data sequences at a rate exceeding 1,000 words per minute.

BRIEF DESCRIPTION OF THE DRAWINGS

The aforementioned advantages and objects of the present invention as well as additional objects and advantages thereof will be more fully understood hereinafter as a result of a detailed description of a preferred embodiment when taken in conjunction with the following drawings in which:

FIG. 3 comprising

DETAILED DESCRIPTION OF A PREFERRED EMBODIMENT

Figure 1:
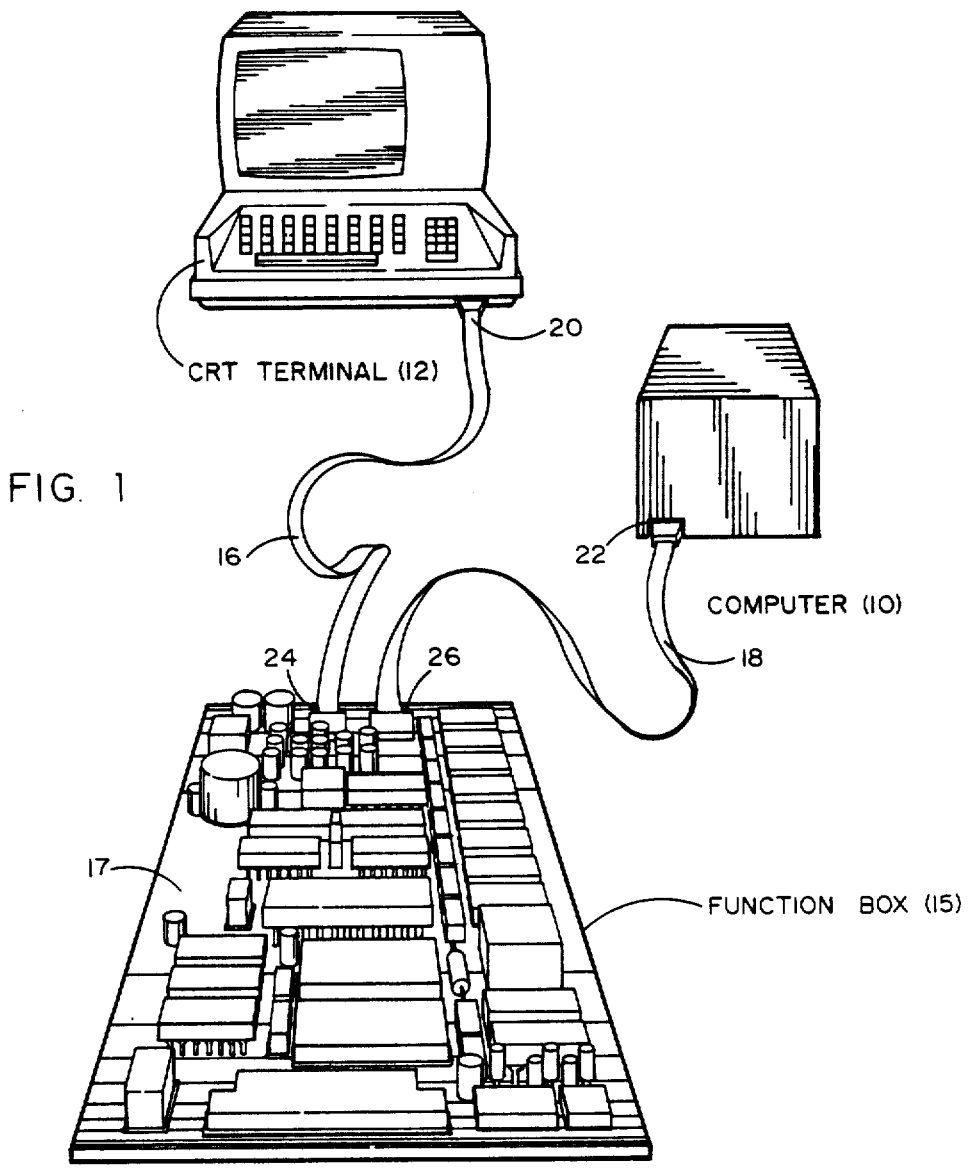
FIG. 1 is a three dimensional illustrative indication of the physical layout of one embodiment of the present invention shown interconnected between a computer and a terminal.

Reference will now be made to FIGS. 1-4 for a detailed description of a preferred embodiment of the invention and more particularly, for a disclosure of the manner of making and using the invention which may be readily understood by one skilled in the art to which the present invention pertains. Referring first to FIG. 1 it will be seen that the invention is designed to be interconnected between a computer 10 and a CRT keyboard terminal 12, the "function box" 15 of the present invention as illustrated in the embodiment herein described being configured in the form of a single printed circuit board 17. The function box 15 of the invention is interconnected between the CRT terminal 12 and the computer 10 by a pair of interface cables 16 and 18, respectively. These cables 16 and 18 are attached to connectors 20 and 22 on the CRT terminal 12 and computer 10, respectively, which would otherwise conventionally enable direct interconnection between the computer 10 and CRT terminal 12. Cables 16 and 18 connect to the function box 15 by appropriate interface connectors 24 and 26, respectively, mounted on printed circuit board 17 in a well-known manner.

Figure 2:
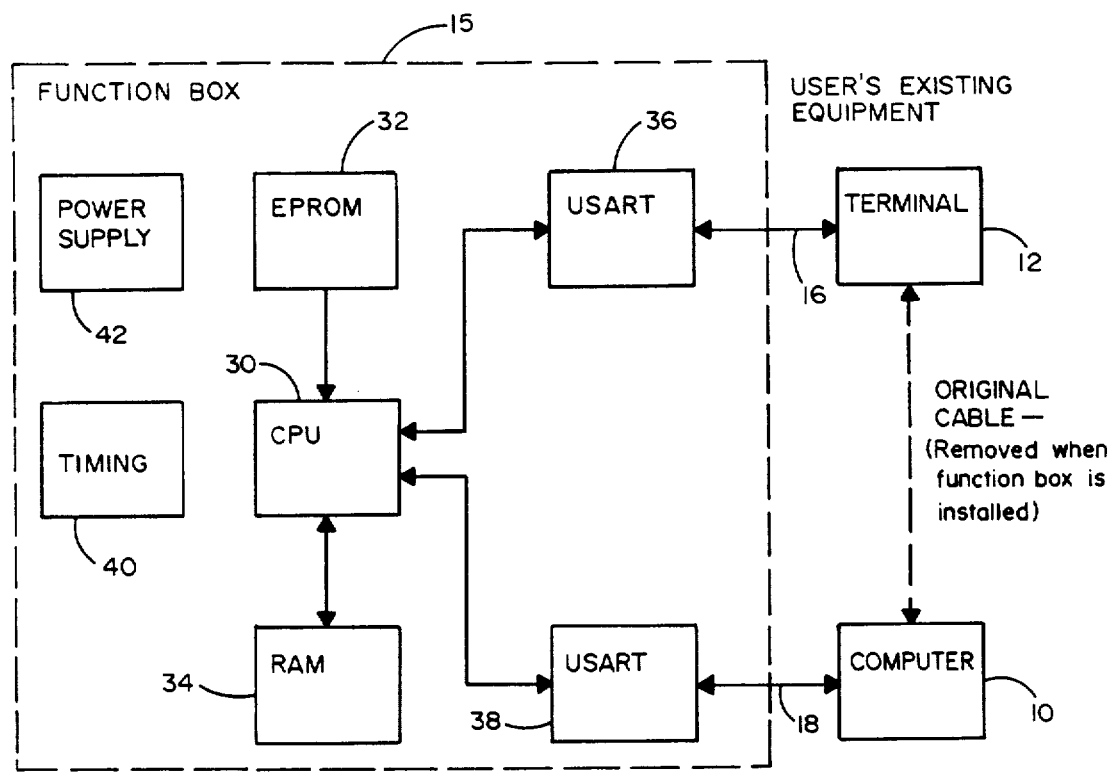
FIG. 2 is a simplified block diagram of the present invention illustrating the manner in which it may be connected to a user's existing equipment.
Figure 4:
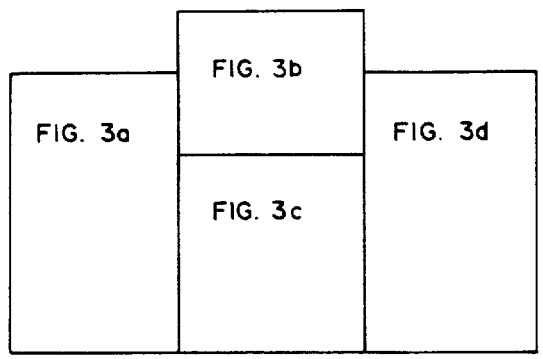
FIG. 4 is a drawing illustrating the manner in which FIG. 3 should be viewed.
Figure 3A:
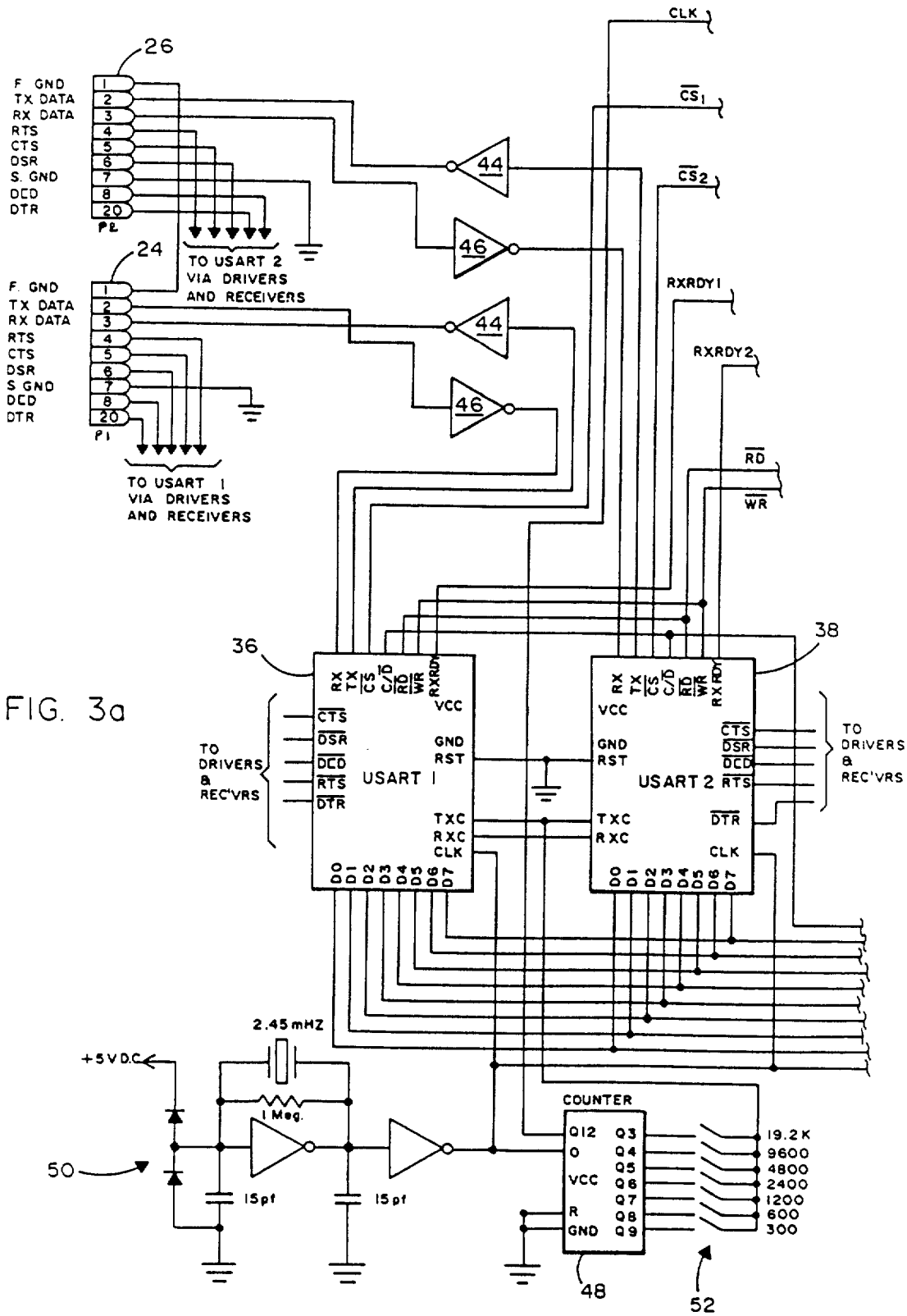
FIGS. 3a, 3b, 3c and 3d, is a detailed schematic drawing of one embodiment of the present invention.
Figure 3B:
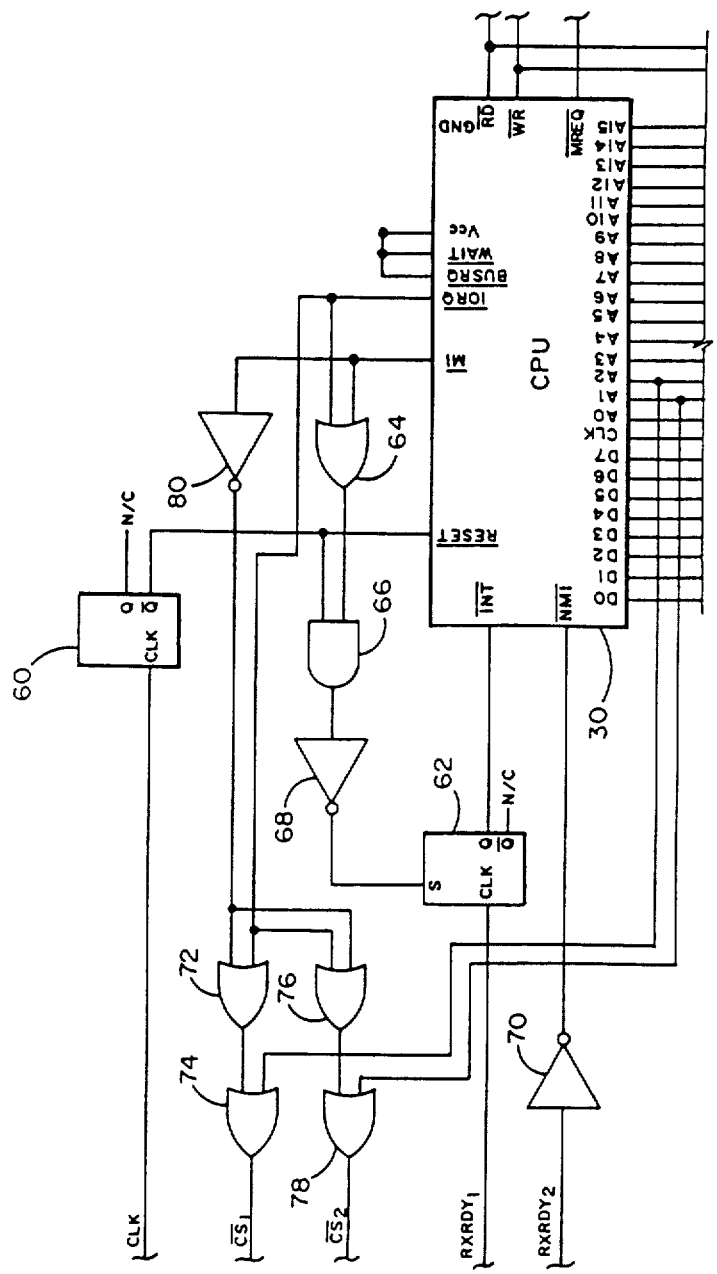
Figure 3C:
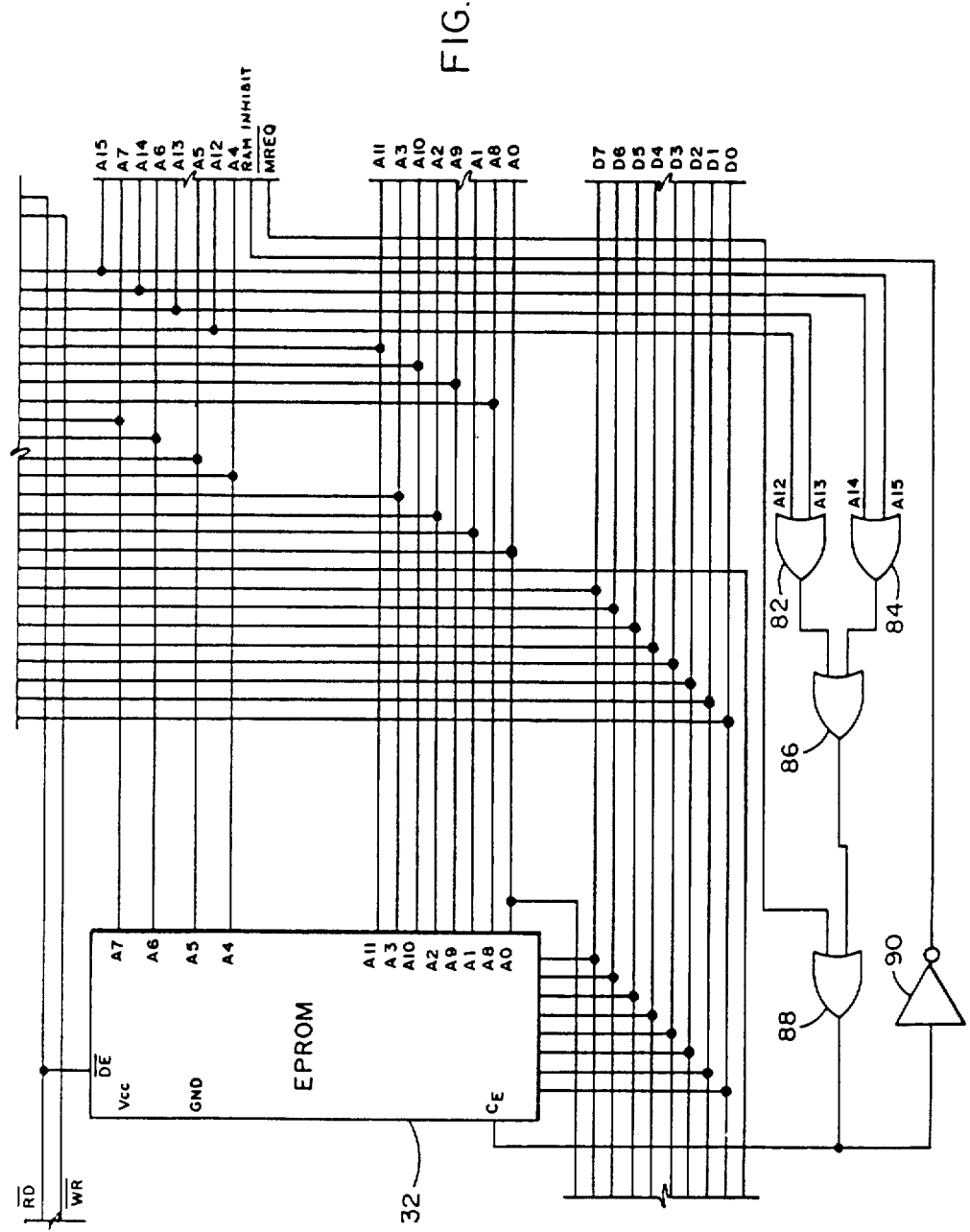
Figure 3D:
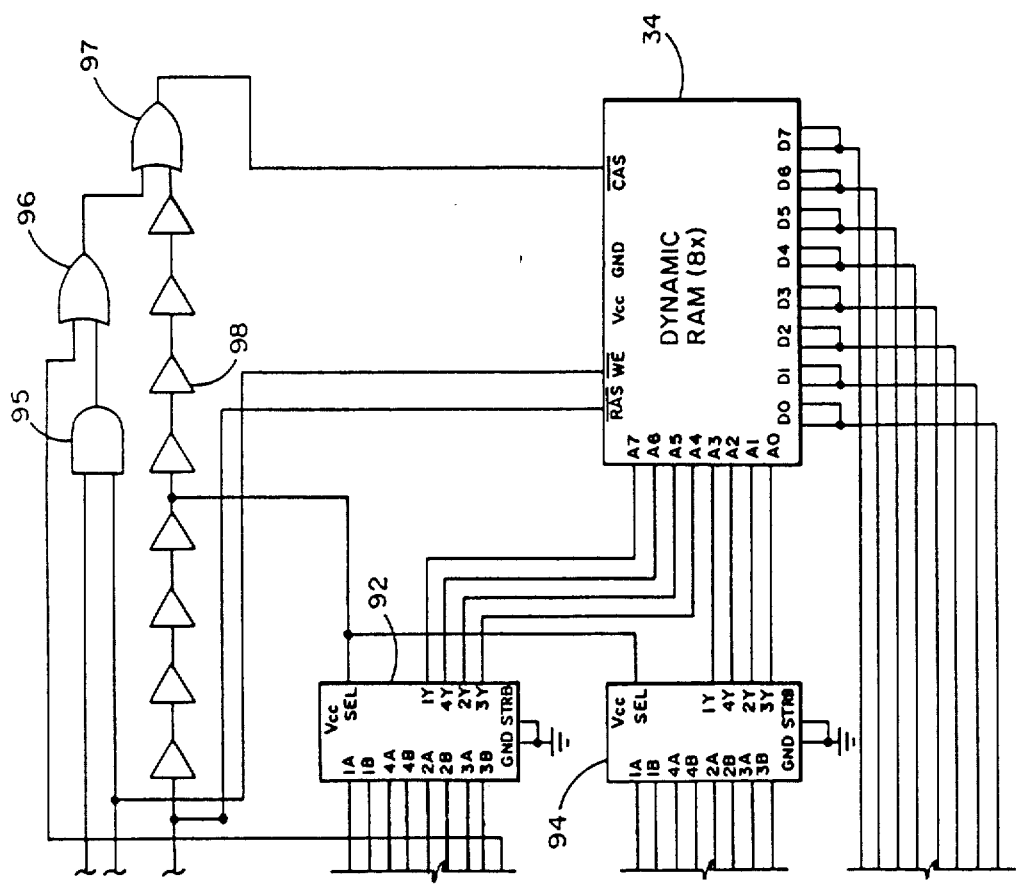

The principal components of the function box 15 of the present invention are illustrated in FIG. 2. More specifically, as seen in FIG. 2 the function box 15 comprises a central processing unit (CPU) 30, an erasable, programmable read-only memory unit (EPROM) 32, a random access memory (RAM) 34, a pair of universal asynchronous receiver transmitters (USART) 36 and 38, timing circuit 40 and a power supply 42. The CPU 30 may be way of example be an 8-bit Z80A microprocessor chip manufactured by Zilog. EPROM 32 may be way of example by a type 2732 4K×8 EPROM manufactured by Intel Corporation. RAM 34 may by way of example be provided in the form of eight 64 K bit dynamic RAM Model TMM4164P-2 chips such as manufactured by Texas Instruments, and each USART1 36 and USART2 38 may by way of example be of the type 8251 USART such as the μPD8251 manufactured by NEC Microcomputers, Inc. As seen further in FIG. 2, function box 15 of the present invention may be connected between the computer 10 and terminal 12 of the user's existing equipment instead of the original cable interconnecting those units, which cable is removed when the function box 15 is installed. Those having skill in the art to which the present invention pertains will understand that there are a plurality of signal line drivers 44 and receivers 46 interconnecting the USART1 36 and USART2 38 with the terminal and computer cable connectors 24 and 26, respectively. These signal line drivers 44 and receivers 46 are shown in the detailed schematic of the present invention illustrated in FIG. 3 comprising FIGS. 3a, 3b, 3c and 3d which represent the entire function box electronics when configured in the manner illustrated in FIG. 4. More specifically, FIG. 3a is directed primarily to the interface between the connectors 24 and 26 and the respective USART1 and USART2 via line drivers 44 and receivers 46 and also to the clock circuitry 50 from which the internal timing signals for the entire function box are derived. FIG. 3b is directed primarily to the microprocessor central processing unit 30 and various control logic interface circuitry associated with the CPU. FIGS. 3c and 3d are directed primarily to the EPROM 32 and to the RAM 34, respectively and their associated control, address and data circuitry.

Several of the chips, including USART1 36 and USART2 38, CPU 30, EPROM 32 and RAM 34 are connected to a 16-bit address bus comprising signals A0 through A15 and to an 8-bit data bus comprising signals D0 through D7.

Referring first to FIG. 3a it will be seen that the connectors 24 and 26 each have an identical set of pins for data transmit and receive lines, signal and frame grounds and "handshaking" signals compatible with typical RS232 transmission protocol functions well-known in the art. As shown further in FIG. 3a, many of the pins of connectors 24 and 26 interface with one of the two USART1 36 and USART2 38 through signal line drivers and receivers 44 and 46 such as Models MC1488P RS232 line driver and MC1489P RS232 line receiver manufactured by Mostek, respectively selected for the appropriate direction of data flow for the signal on each pin. As shown further in FIG. 3a, USART1 36 and USART2 38 convert received serial data into an 8-bit parallel data format for application to the data bus for use within the function box 15 and conversely received 8-bit parallel data from the data bus within the function box 15 and convert it into a serial data format for transmission out of function box 15.

Communication between USART1 36 and USART2 38 and the CPU 30 shown in FIG. 3b is accomplished by the interconnection therebetween of lines carrying data, address, timing (clock), chip select, receiver ready and read and write signals. The clock signal is generated by a 12 stage binary counter 48 which may by way of example be a Model CD4040A binary counter manufactured by RCA. The input to the counter is generated by a timing circuit 50 which includes a 2.45 MHz crystal oscillator. The output signals of counter 48, corresponding to the third through the ninth stages of the counter, are applied to separate poles of DIP switch 52 for connection to the clock input of both USART1 36 and USART2 38 for selection of the transmission speed ("baud rate") compatible with the data transmission speed of the terminal 12 and computer 10 with which the function box 15 is used. The chip select signals (CS1 and CS2) applied to USART1 36 and USART2 38, respectively, are generated by CPU 30 and associated logic which will be described hereinafter in conjunction with FIG. 3b. CS1 and CS2 are applied to the CS inputs of USART1 36 and USART2 38 to enable each USART for reading and writing to the CPU 30. In addition to CS1 and CS2 which are derived from signals on address lines A2 and A1, respectively, address line A0 applied to the C/D USART input selects whether the control (status) registers or data registers of USART1 36 and USART2 38 are enabled. The receiver ready signals (RXRDY1 and RXRDY2) are outputs from the USART1 36 and USART2 38, respectively, which indicate that the USART receiver buffer is ready with an assembled character for input to the CPU 30. Two additional control signals generated by the CPU 30 and applied to the USART1 36 and USART2 38 of FIG. 3b, are the write data signal (WR) and the read data signal (RD). The write data signal indicates that the CPU 30 is placing data or a control word on the data bus. The read data signal indicates that the CPU 30 is awaiting data or status information on the data bus.

Reference will now be made to FIG. 3b for a description of the CPU 30 and the logic circuits associated therewith. CPU 30 in the embodiment of the invention illustrated herein comprises a Z80A microprocessor which is well-known in the electronics/computer industry and is described in detail by a number of texts including for example the text entitled "Z80 User's Manual" by Joseph J. Carr, copyright 1980 by Reston Publishing Company, Reston, Va. The Z80A CPU 30 is a 40 pin integrated circuit package which generates 16 address bits to permit addressing up to 64 K bytes of memory and also uses eight of the address bits to address up to 256 different I/O devices. CPU 30 also attaches to an 8-bit bidirectional data bus. The CPU clock input (CLK) is derived from the 2.45 MHz timing circuit 50 of FIG. 3a.

Other pin functions of CPU 30 which are used in the embodiment of the present invention include the following: non-maskable interrupt (NMI) which causes the CPU to honor the interrupt at the end of the current instruction cycle regardless of the state of the interrupt flip-flop; Interrupt (INT) which tells the CPU that an external device has requested an interrupt; RESET which clears the CPU program counter and internal registers; M1 which indicates that the CPU is in the operation code fetch portion of an instruction/execution cycle; Input/output request (IORQ) which indicates that an input or output operation is to take place and to also acknowledge an interrupt request by telling the interrupting device to place the interrupt vector word on the data bus; Read data (RD) which indicates when a read operation from memory or from an I/O device to the CPU is to take place; Write data (WR) which indicates when a write operation from the CPU to a memory location or to an I/O device is to take place; and Memory request (MREQ) which indicates when the address on the address bus is valid for a memory read or write operation.

The various logic elements associated with the CPU 30 and illustrated in FIG. 3b are utilized to control the timing and signal flow between the CPU 30 and the USART1 36, USART2 38, EPROM 32 and RAM 34. For example the timing signal generated by the twelfth stage output of counter 48 of FIG. 3a is applied to the clock terminal of flip-flop 60, the output of which resets the CPU 30 and the interrupt flip-flip 62 when 5 volts dc is applied to its D2 input. This reset signal causes the internal program counter of the CPU 30 to be loaded with all zeros thereby forcing the CPU to jump to EPROM location 0000 and thus restart the operational cycle. RXRDY1, which is the receiver ready output of USART1 36, is applied to flip-flop 62, an output of which is applied to the INT terminal of the CPU 30. Application of the interrupt signal to the CPU 30 from flip-flop 62 is controlled by the input to the select terminal of the flip-flop which is derived from a logic circuit consisting of OR gate 64, AND gate 66 and inverter 68. The input signals to OR gate 64 are the M1 and IORQ signal outputs of the CPU. The output of OR gate 64 is applied as one input to AND gate 66, with the other input being the reset signal generated by flip-flop 60. RXRDY2, which is derived from USART2 38, is applied directly to the non-maskable interrupt (NMI) input of the CPU 30 through an inverter 70. Chip select signals CS1 and CS2, which are derived from the CPU 30 signals, are formed in logic circuits comprising OR gates 72, 74, 76 and 78 and inverter 80 and applied to USART1 36 and USART2 38, respectively. As seen in FIG. 3b the output signals from OR gates 72 and 76 are both derived from the combination of IORQ and inverted M1 signals output from the CPU 30. These output signals are applied as the inputs respectively to OR gates 74 and 78. The other input signals to gates 74 and 78 comprise address bit A2 in the case of OR gate 74 and address bit A1 in the case of OR gate 78. CPU output signals RD, WR and MREQ are applied to the EPROM circuits of FIG. 3c and to the RAM circuits of FIG. 3d which will be discussed hereinafter.

Reference will now be made to FIG. 3c. EPROM 32 is a 4K×8-bit read-only memory storage device which is used to store the control program of the present invention such as presented hereinafter in Table I. EPROM 32, when enabled, reads out 8 bits of data from one of 4096 locations designated by the address bits A0 through A11. The chip is enabled by an MREQ output from the CPU 30 combined with the absence of address signals A12 through A15. OR gates 82, 84, 86 and 88 apply an inhibit signal to CE pin of EPROM 32 in the absence of a memory request signal from the CPU 30 or in response to a TRUE condition on any address line A12 through A15. The address data output of EPROM 32 is read onto the data bus by the application of the RD signal to the DE pin by CPU 30. A buffer 90 is also connected to OR gate 88 to invert the EPROM inhibit signal, thereby enabling the RAM 34 as seen best in FIG. 3d which will now be discussed in more detail.

Referring now to FIG. 3d it will be seen that the dynamic RAM 34 accepts 8 address lines and 8 data lines. The 8 address inputs are used in combination with a row address select (RAS) signal and a column address select (CAS) signal to form the 16-bit address required to specify one of 65,536 storage cell locations simultaneously in each of the 8 segments of dynamic RAM 34. This is accomplished in the circuit of FIG. 3d by utilizing a two two-line to one-line multiplexers 92 and 94 which may for example be type 74LS157 quadruple 2 to 1 multiplexers manufactured by Texas Instruments, Incorporated. More specifically, as seen in FIG. 3d, half of the 16 address lines from the CPU 30 are applied to each of the multiplexers 92 and 94. Then based upon the polarity of the signal applied simultaneously to the SEL terminals of multiplexers 92 and 94, the outputs labelled 1Y, 2Y, 3Y and 4Y for each of the multiplexers, applied eight of the 16 address bits to the address lines A0 through A7 of the eight dynamic RAM chips 34. The initial addressing information to the dynamic RAM 34 consists of 8 ROW address bits which are applied to these lines and latched into the chip by the row address select signal RAS. Subsequently, the 8 column address bits are applied to these lines and latched into the chips by the column address select signal CAS.

The logic circuitry associated with dynamic RAM 34 as seen in FIG. 3d provides the proper signals and timing thereof to sequence the row and column addressing as described. As seen further in FIG. 3d the logic devices used in conjunction with dynamic RAM 34 comprise an AND gate 95, OR gates 96 and 97 and a string of serially connected drivers 98 designed to provide the requisite time delay for the acceptance of both sets of address signals, that is, application of row or column address select signals to pins RAS and CAS of RAM 34. As seen in FIG. 3d the MREQ signal is applied directly to the RAS terminal of dynamic RAM 34 whereby to immediately strobe into RAM 34 the address signals appearing at the output of multiplexers 92 and 94. Furthermore it is seen that the select pins of the multiplexers 92 and 94 are connected to the time delay drivers 98 "downstream" of the MREQ input to assure that the ROW address select signal RAS will be applied to the dynamic RAM 34 before the output of multiplexers 92 and 94 changes to provide the column signal. Furthermore, it is seen that the CAS signal is derived from the OR gate 97 which again is "downstream" of the select signal applied to the multiplexers 92 and 94 in the string of drivers 98. Accordingly, the application of the column address select signal to the CAS pin of RAM 34 will be subsequent to the initial availability of the second set of address signals corresponding to the column selection in the RAM. A second input to OR gate 97 comprises the output of OR gate 96 which receives as its two inputs the memory request/chip enable signal discussed earlier in conjunction with FIG. 3c as well as the output of AND gate 95 to which the RD and WR signals are applied from the CPU 30 illustrated in FIG. 3b. In addition to enabling the column address select of RAM 34, the combination of these signals and their various polarities cause the multiplexers 92 and 94 and the RAM 34 to revert to the row address select condition for the next RAM 34 address operation.

Table I illustrates both a rudimentary assembly language listing and the corresponding machine language code for the EPROM 32 such as that which can be used for controlling the basic operations of the invention. Of course, those having skill in the art to which the present invention pertains will appreciate that the EPROM 32 may be loaded with a variety of different programs for carrying out the operations of the present invention in different formats. In the version of the program indicated in Table I and loaded into the EPROM in the embodiment illustrated, the program will accept up to 256 sequences each identified by a two-character alphanumeric code name. Of course, the program can be expanded to include such features as longer sequence code names, more sequences, error checking, sequence reloading during operation, and additional controls ("handshaking") for interfaces to the computer and to the terminal, all of which are well within the ordinary skill of the competent assembly or machine language programmer and therefore need not be described in further detail herein.

TABLE I

| | | | FUNCTION BOX EPROM CODE | | | |
|---|---|---|---|---|---|---|
| | | 0001 | ;code for Z80A processor, RS-232C interfaces, ASCII terminal | | | |
| | | 0002 | ;maximum of 256 sequences, denoted as AA-AP, BA-BP, . . . PA-PP | | | |
| | | 0003 | ;Control-@ = enter command mode; next 2 characters identify sequence | | | |
| | | 0004 | ;[ = end of sequence, [[ = end of file | | | |
| | | 0005 | | | | |
| | (1000) | 0006 | nextadd: | equ | 1000h | ;address of next character |
| | (1100) | 0007 | addtbl: | equ | 1100h | ;address table base |
| | (1300) | 0008 | chartbl: | equ | 1300h | ;sequence table base |
| | (0001) | 0009 | rda: | equ | 01h | ;read buffer data available |
| | (0000) | 0010 | tbe: | equ | 00h | ;transmit buffer empty |
| | (0002) | 0011 | Cdata: | equ | 02h | ;I/O data port (computer) |
| | (0003) | 0012 | Cstat: | equ | 03h | ;I/O status port (computer) |
| | (0004) | 0013 | Tdata: | equ | 04h | ;I/O data port (terminal) |
| | (0005) | 0014 | Tstat: | equ | 05h | ;I/O status port (terminal) |
| | | 0015 | | | | |
| | (0100) | 0016 | | org | 100h | ;origin |
| 0100 | 3ECE | 0017 | setIO: | ld | a,0CEh | ;asynch, 16x, no parity, 8 data, 2 stop bits |
| 0102 | D303 | 0018 | | out | Cstat,a | ;set computer USART |
| 0104 | D305 | 0019 | | out | Tstat,a | ;set terminal USART |
| 0106 | 3E00 | 0020 | noentry: | ld | a,0 | ;reset counter for "no-entry" pointers |
| 0108 | 0600 | 0021 | | ld | b,0 | ;b=value to be loaded into address table |
| 010A | 210111 | 0022 | | ld | hl,addtbl+1 | ;first high order sequence address byte |
| 010D | 70 | 0023 | none: | ld | (hl),b | ;load high order address bytes with 0 |
| 010E | 3D | 0024 | | dec | a | ;decrement counter |
| 010F | B8 | 0025 | | cp | a,b | ;check for counter=0 |
| 0110 | 23 | 0026 | | inc | hl | ;next address low order byte |
| 0111 | 23 | 0027 | | inc | hl | ;next address high order byte |
| 0112 | C20D01 | 0028 | | jp | nz,none | ;not yet 256 entries |
| 0115 | 210013 | 0029 | | ld | hl,chartbl | ;hl=character table base |
| 0118 | 220010 | 0030 | | ld | (nextadd),hl | ;set next address value=character table base |
| | | 0031 | | | | |
| 011B | DB05 | 0032 | name: | in | a, Tstat | ;input terminal port status register |
| 011D | E601 | 0033 | | and | rda | ;check for character available |
| 011F | CA1B01 | 0034 | | jp | z,name | ;wait for character |
| 0122 | DB04 | 0035 | | in | a,Tdata | ;get character from terminal |
| 0124 | CDC501 | 0036 | | call | Cout | ;send character to computer |
| 0127 | CDB901 | 0037 | | call | Tout | ;send character to terminal |
| 012A | FE0D | 0038 | | cp | 0Dh | ;test for carriage return |
| 012C | C21B01 | 0039 | | jp | nz,name | ;continue loading file name |
| 012F | CDD101 | 0040 | | call | cload | ;ignore line feed after carriage return |
| 0132 | CDD101 | 0041 | loadno: | call | Cload | ;get character from computer |
| 0135 | FE5B | 0042 | | cp | 5Bh | ;check for end of file |
| 0137 | CA6101 | 0043 | | jp | z,operate | ;end of file, operate |
| 013A | FE41 | 0044 | | cp | 41h | ;check for alphabetic character |
| 013C | FA3201 | 0045 | | jp | m,loadno | ;wait for alphabetic character |
| 013F | 57 | 0046 | | ld | d,a | ;d=first character of sequence name |
| 0140 | CDD101 | 0047 | | call | Cload | ;get second character of sequence name |
| 0143 | CDDB01 | 0048 | | call | seqno | ;hl=address table location, de=nextadd location |
| 0146 | EB | 0049 | | ex | de,hl | ;hl=nextadd location, de=address table location |
| 0147 | EDA0 | 0050 | | ldi | | ;load low order byte of next address into table |
| 0149 | EDA0 | 0051 | | ldi | | ;load high order byte |

TABLE I-continued
FUNCTION BOX EPROM CODE

| | | | | | | |
|---|---|---|---|---|---|---|
| 014B | 2A0010 | 0052 | | ld | hl,(nextadd) | ;hl=next available character tableaddress |
| 014E | CDD101 | 0053 | | call | Cload | ;ignore next character: name/data separator |
| 0151 | CDD101 | 0054 | loadseq: | call | Cload | ;accept character from computer |
| 0154 | 77 | 0055 | | ld | (hl),a | ;store character in sequence table |
| 0155 | 23 | 0056 | | inc | hl | ;increment sequence table |
| 0156 | FE5B | 0057 | | cp | 5Bh | ;check for end of sequence |
| 0158 | C25101 | 0058 | | jp | nz,loadseq | ;not end of sequence, continue loading |
| 015B | 220010 | 0059 | | ld | (nextadd),hl | ;store next address in nextadd |
| 015E | C33201 | 0060 | | jp | loadno | ;end of sequence, get next sequence name |
| | | 0061 | | | | |
| 0161 | DB03 | 0062 | operate: | in | a, Cstat | ;input computer port status register |
| 0163 | E601 | 0063 | | and | rda | ;check for data available |
| 0165 | C4B701 | 0064 | | call | nz,Cchar | ;character waiting from computer |
| 0168 | DB05 | 0065 | | in | a, Tstat | ;input terminal port status register |
| 016A | E601 | 0066 | | and | rda | ;check for data available |
| 016C | CA6101 | 0067 | | jp | z,operate | ;no character waiting from terminal |
| 016F | CDAD01 | 0068 | | call | tchar | ;character waiting from terminal |
| 0172 | FE00 | 0069 | | cp | 00 | ;check for start sequence command |
| 0174 | CA7D01 | 0070 | | jp | z,command | ;get sequence name |
| 0177 | CDC501 | 0071 | | call | Cout | ;not command, send character to computer |
| 017A | C36101 | 0072 | | jp | operate | ;wait for next input |
| | | 0073 | | | | |
| 017D | CDA601 | 0074 | command: | call | Tin | ;get character from terminal |
| 0180 | 57 | 0075 | | ld | d,a | ;d=first character of sequence name |
| 0181 | CDA601 | 0076 | name2: | call | Tin | ;get character from terminal |
| 0184 | CDDB01 | 0077 | | call | seqno | ;hl=address table location, de=nextadd location |
| 0187 | 23 | 0078 | | inc | hl | ;hl=high order address byte |
| 0188 | 7E | 0079 | | ld | a,(hl) | ;a=high order byte of address table location |
| 0189 | FE00 | 0080 | | cp | 0 | ;check for no entry for this name |
| 018B | CA6101 | 0081 | | jp | z,operate | ;no entry for this sequence name |
| 018E | 2B | 0082 | | dec | hl | ;restore hl to address table location |
| 018F | EDA0 | 0083 | | ldi | | ;move low order byte to nextadd |
| 0191 | EDA0 | 0084 | | ldi | | ;move high order byte to nextadd |
| 0193 | 2A0010 | 0085 | | ld | hl,(nextadd) | ;hl=address of first character of sequence |
| 0196 | 7E | 0086 | seqout: | ld | a,(hl) | ;a=character to be sent to computer |
| 0197 | FE5B | 0087 | | cp | 5Bh | ;check for end of sequence |
| 0199 | CA6101 | 0088 | | jp | z,operate | ;end of sequence, wait for next operation |
| 019C | CDC501 | 0089 | | call | Cout | ;send character to computer |
| 019F | CDB001 | 0090 | | call | Cin | ;get character from computer |
| 01A2 | 23 | 0091 | | inc | hl | ;increment hl for next character |
| 01A3 | C39601 | 0092 | | jp | seqout | ;get next character from sequence table |
| | | 0093 | | | | |
| 01A6 | DB05 | 0094 | Tin: | in | a, Tstat | ;read terminal port status register |
| 01A8 | E601 | 0095 | | and | rda | ;check for character available |
| 01AA | CAA601 | 0096 | | jp | z,tin | ;wait for character |
| 01AD | DB04 | 0097 | tchar: | in | a,Tdata | ;read terminal data register |
| 01AF | C9 | 0098 | | ret | | ;return |
| 01B0 | DB03 | 0099 | Cin: | in | a, Cstat | ;read computer port status register |
| 01B2 | E601 | 0100 | | and | rda | ;check for character available |
| 01B4 | CAB001 | 0101 | | jp | z,Cin | ;wait for character |
| 01B7 | DB02 | 0102 | Cchar: | in | a,Cdata | ;get character from computer |
| 01B9 | F5 | 0103 | Tout: | push | af | ;save character to be transmitted |
| 01BA | DB05 | 0104 | Toutck: | in | a,Tstat | ;read terminal output buffer status |
| 01BC | E600 | 0105 | | and | tbe | ;check for transmit buffer empty |
| 01BE | CABA01 | 0106 | | jp | z,Toutck | ;wait for transmit buffer to empty |
| 01C1 | F1 | 0107 | | pop | af | ;recall character to be transmitted |
| 01C2 | D304 | 0108 | | out | Tdata,a | ;send character |
| 01C4 | C9 | 0109 | | ret | | ;return |
| 01C5 | F5 | 0110 | Cout: | push | af | ;save character to be transmitted |
| 01C6 | DB03 | 0111 | Coutck: | in | a,Cstat | ;read computer output buffer status |
| 01C8 | E600 | 0112 | | and | tbe | ;check for transmit buffer empty |
| 01CA | CAC601 | 0113 | | jp | z,Coutck | ;wait for transmit buffer to empty |
| 01CD | F1 | 0114 | | pop | af | ;recall character to be transmitted |
| 01CE | D302 | 0115 | | out | Cdata,a | ;send character |
| 01D0 | C9 | 0116 | | ret | | ;return |
| 01D1 | DB03 | 0117 | Cload: | in | a,Cstat | ;read computer port status register |
| 01D3 | E601 | 0118 | | and | rda | ;check for character available |
| 01D5 | CAD101 | 0119 | | jp | z,Cload | ;wait for character |
| 01D8 | DB02 | 0120 | | in | a,Cdata | ;get character |
| 01DA | C9 | 0121 | | ret | | ;return |
| 01DB | F660 | 0122 | seqno: | or | 60h | ;convert to lower case |
| 01DD | D661 | 0123 | | sub | 61h | ;convert to hex value 0-F |
| 01DF | 5F | 0124 | | ld | e,a | ;e=4 low order bits of name |
| 01E0 | 7A | 0125 | | ld | a,d | ;a=first character of name |
| 01E1 | F660 | 0126 | | or | 60h | ;convert to lower case |
| 01E3 | D661 | 0127 | | sub | 61h | ;convert to hex value 0-F |
| 01E5 | CB27 | 0128 | | sla | a | ;shift left one bit |
| 01E7 | CB27 | 0129 | | sla | a | ;shift left two bits |
| 01E9 | CB27 | 0130 | | sla | a | ;shift left three bits |
| 01EB | CB27 | 0131 | | sla | a | ;a=4 high order bits of name |
| 01ED | 83 | 0132 | | add | a,e | ;a=sequence number (00-FFh) |

TABLE I-continued

| | | | FUNCTION BOX EPROM CODE | | |
|---|---|---|---|---|---|
| 01EE | 1600 | 0133 | ld | d,0 | ;d=0 |
| 01F0 | 5F | 0134 | ld | e,a | ;e=sequence number |
| 01F1 | 210011 | 0135 | ld | hl,addtbl | ;hl=address table base |
| 01F4 | 19 | 0136 | add | hl,de | ;hl=address table base+sequence number |
| 01F5 | 19 | 0137 | add | hl,de | ;hl=address table base+2*sequence number |
| 01F6 | 110010 | 0138 | ld | de,nextadd | ;de=next address location |
| 01F9 | C9 | 0139 | ret | | ;hl=address table location for this sequence |
| 01FA | (0000) | 0140 | END | | |

FUNCTION BOX OPERATION

A preferred embodiment of the invention, as described in FIGS. 1-4 and with a program such as that listed in TABLE I contained in the invention's EPROM, would operate in the manner discussed below. This version of the EPROM program accepts files containing up to 256 user-defined character sequences, with each sequence being of any length and identified by an alphanumeric code name of two characters, and comprising a total of approximately 60,000 characters, to be loaded into the invention's RAM storage. Of course, this program could be expanded to include more sequences, longer sequence names, error checking, sequence reloading during operation, additional transmission line interface controls, and other functional and operational features for both generalized and specific applications.

This EPROM code for this embodiment of the present invention has three modes of operation: the "load" mode, the "transparent" mode, and the "sequence" mode. The "load" mode allows the user to load the desired file of pre-defined character sequences into the invention's memory. In the "transparent" (normal) mode, all communications between the terminal and computer are passed through without change and the system operates just as it did without the invention. Although these operations are "transparent" to the user, to the terminal, and to the computer, the invention monitors all transmissions from the terminal to determine whether it has been instructed to enter the "sequence" mode and "type out" a specific character sequence to the computer. Once a user-selected sequence has been "typed out", the invention automatically reverts to the "transparent" mode of operation.

When power is applied to the invention, this EPROM program first initiates the "load" mode of operation. From the terminal's keyboard, the user enters the computer's operating system command which causes the contents of a text file to be displayed on the terminal's screen and the name of the desired file of character sequences (for example, the command "TYPE" and the file name "SAMPLE.FBX"). Without the present invention, or with the invention in the "transparent" mode, this operation would cause the specified text file to be displayed on the terminal's screen. However, because the invention is in the "load" mode, the contents of that text file are loaded into the invention's memory instead.

Each character sequence in a pre-defined sequence file is preceded by a two-character name identifying that sequence (such as AA through AP, BA through BP, etc., as accepted by the EPROM program of TABLE I), and is ended by an "end-of-sequence" character (such as [ as accepted by the EPROM program of TABLE I). Two consecutive "end-of-sequence" characters indicate the end of the sequence file.

During loading, an address table and a sequence table are formed in the invention's RAM. As each sequence in the sequence file is read into the invention, a two-byte "starting address" for that sequence is stored in the address table; this is a "pointer" to the location in the sequence table where the first character of that sequence will be stored. The sequence data is then stored character-by-character in the sequence table as it is received from the computer, until an "end-of-sequence" character has been encountered and stored. As each character is stored, the "next address" counter, comprising two bytes in RAM, is incremented to contain the address of the next available RAM location.

After loading a character sequence, the value in the "next address" counter is used as the "starting address" for the next sequence, and the above process of building the address and sequence tables is repeated until two consecutive "end-of-sequence" characters are encountered, indicating the end of the sequence file. This completes the "load" operation and the invention automatically enters the "transparent" mode.

In the "transparent" mode, all characters sent by the computer to the terminal are received by the invention and retransmitted without change to the terminal. As each character is entered from the terminal's keyboard, however, the invention checks to determine whether it is an "enter sequence mode" code (such as Control-@ as accepted by the EPROM program of TABLE I) indicating that the user wishes to enter the "sequence" mode. If the character is not an "enter sequence mode" code, it is retransmitted to the computer and the invention waits for the next character from the computer or from the terminal.

If the character from the terminal is an "enter sequence mode" code, the invention enters the "sequence mode". It accepts the next two characters as specifying a sequence name and refers to the address table in RAM for the starting address of that sequence. If there is no entry in the address table for that sequence name, the invention returns to the "transparent" mode.

If there is data for the specified sequence, the invention reads it character-by-character from the sequence table in RAM and transmits it to the computer. When an "end-of-sequence" character is encountered, this transmission stops and the invention reverts to the "transparent" mode.

Thus, the invention accepts a 2-character sequence name from the terminal's keyboard and "types out" the entire pre-defined character sequence corresponding to that sequence name to the computer just as if the entire sequence had been entered through the terminal's keyboard.

Character sequence files for use with the invention can be created, merged, edited and stored or copied for later or repeated use with a word processor or other program that stores information in ASCII format. When the invention is in the "load" mode, trying to load a program file that contains machine language code or data in binary form may cause unpredictable results, and may cause the computer, terminal, or invention to halt operations or "hang up". This does not preclude the normal operational use of machine language or binary code, however, as such data will result in normal operations when the invention is in the "transparent" mode.

A character sequence can contain any ASCII alphabetic, numeric, punctuation or "control" characters accepted by the application program running in the computer which will receive sequences "typed out" by the invention. Either of the two sample character sequence formats shown below can be used when creating a sequence file; each would result in the same sequence being "typed out" by the invention. (Control-M, sometimes shown as ΛM, is a single ASCII-standard control character used to specify a carriage return operation.)

jd John Doe ΛM123 A Street ΛMNew City, N.Y. 12345[
JD
John Doe
123 A Street
New City, N.Y. 12345[

The first two characters (jd or JD) specify the sequence name; upper and lower case are considered to be the same character. The character immediately following the name is ignored; this can be a space, carriage return or any other character and is used to separate the sequence name and its corresponding data to make the sequence files easier to review. In the first sample, it is assumed that the application program which will receive inputs from the invention accepts ΛM (Control-M) as commanding a carriage return. The final character ([) indicates the end of the sequence, and two consecutive "end-of-sequence" characters would indicate the end of the file.

Both of these sample formats would result in the same sequence being "typed out" by the invention in response to the "enter sequence" code (Control-@) followed by the sequence name (jd or JD):

John Doe
123 A Street
New City, N.Y. 12345

Two "reserved" characters are required for use with this version of the EPROM code. The "enter sequence mode" code from the terminal's keyboard indicates that the invention is to enter the "sequence" mode. This character (such as Control-@ as accepted by the EPROM program of TABLE I) can not be entered from the keyboard for any other purpose when the invention is in the "transparent" mode, but it can be included within character sequences to be stored in the invention. The "end-of-sequence" character (such as [ as accepted by the EPROM program of TABLE I) indicates the end of a character sequence in a file or the end of a sequence file itself, and thus cannot be can not be included in a file for any other purpose. However, this character can be entered from the keyboard.

It will now be understood that what has been disclosed herein comprises a character sequence generator for facilitating entry of pre-defined data into a computer system and comprising means for entering and storing pre-defined sequences of data within a data memory storage device, each such sequence being addressable by a simple alphanumeric code name and further comprising means for accepting each such alphanumeric code name and reading each such corresponding predefined data sequence at its location in the memory storage device and means for connecting the output to a computer system and for transmitting each such predefined data sequence to the computer system in response to the selected alphanumeric code name as if each such data sequence had been manually entered in full using the system's keyboard. The invention comprises a small auxiliary device herein called a function box that facilitates manual entry of frequently used information into a computer system with fewer keystrokes, fewer errors, faster access, faster entry and automatic formatting. The function box may be used with virtually any terminal incorporating an RS232-type interface and ASCII character format. The invention is capable of accepting any number of sequences; a two-character alphanumeric code name embodiment of the present invention disclosed herein allows specification of up to 1,296 sequences. In a basic 8-bit embodiment, these sequences can comprise a combined total of up to approximately 60,000 characters; embodiments incorporating a 16-bit microprocessor or techniques such as memory bank switching can be used to significantly increase the maximum total storage capacity. The present invention results in significant improvements relating to the entry of frequently used data into computer systems. One such advantage is the reduction of errors and another is the faster access to data entered into the computer as the invention eliminates the time required to look up or recreate data each time it is to be entered. The invention also permits faster entry of data since it can send data at the highest speed at which the computer and program can accept keyboard entries. Depending upon the speed of the computer and the program receiving the data, the function box can "type" at a rate far exceeding 1,000 words per minute. In a particular embodiment disclosed herein, the invention is connected to a computer and a terminal to provide a "user-defined" data generating interface between the terminal and the computer.

Those having skill in the art to which the present invention pertains will, as a result of the applicant's teaching herein, perceive various modifications and additions to the present invention as well as alternative configurations of hardware and software for carrying out the objects of the invention. However, all such additions, modifications and alternative configurations are deemed to be within the scope of the invention which is to be limited only by the claims appended hereto.

I claim:

1. A computer entry system for entering text data into a computer system from a terminal device, said terminal device including keyboard input means having a plurality of keyboard keys, said entry system being serially interconnected between said terminal device and said computer system, comprising:
   means for bi-directionally receiving and transmitting serial data from and to (1) said computer system and, (2) said terminal device,
   random access read/write memory means for storing predetermined sequences of said text data and corresponding code names received from said computer system, each of said predetermined sequences of text data having a corresponding single- or multi-character alphanumeric code name associated therewith for retrieving said predetermined sequences of text data from said read/write memory means for transmission to said computer system responsive to receipt of a first control code and said code name from said keyboard input means, microprocessor means for controlling said means for bi-directionally receiving and transmitting said serial data, and said random access read/write memory means, said microprocessor means being coupled to (1) said means for bi-directionally receiving and transmitting said serial data, and (2) to said random access read/write memory means, and, read-only memory means coupled to said microprocessor means for storing a program to control the operation of said microprocessor means; said operation of said microprocessor means (1) receives data from said keyboard input means and re-transmits said data to said computer system without modifying said data, said data comprising characters represented by any of said plurality of keyboard keys, (2) receives and subsequently stores said predetermined sequences of text data and said corresponding code names from said computer system, and (3) in response to said first control code receives said code names from said keyboard input means and retrieves said corresponding predetermined text data sequences from said read/write memory means and transmits said predetermined text data sequences in response to a second control code to said computer system, upon which said operation of said microprocessor means returns to said receiving and said re-transmitting without modifying data.

2. The computer entry system as recited in claim 1 wherein each of said predetermined sequences of text data may be (1) any desired combination of characters, and (2) any number of characters, whose combined total of characters does not exceed a storage capacity of said random access read/write memory means.

3. The computer entry system as recited in claim 1 where said computer entry system will store any number of said predetermined sequences of text data and said corresponding code names whose combined total of characters does not exceed said storage capacity of said random access read/write memory means.

4. The apparatus as recited in claim 1 wherein said means for bi-directionally receiving and transmitting serial data includes means for controlling the speed at which said serial data is transmitted and received for maintaining compatibility with the speed of data signal reception and transmission by said computer system and said terminal device.

5. The computer entry system as recited in claim 4 where said means for bi-directionally receiving and transmitting serial data further includes means for controlling the time interval between transmission of characters comprising each of said predetermined sequences of text, said time interval being responsive to the rate of data acceptance by said computer system.

6. A computer entry system serially interconnected between a computer system and an associated terminal device for text data entry subsequent to reception and storage of predetermined sequences of text data and corresponding single- or multi-character alphanumeric code names from said computer system; said terminal device including a keyboard having a plurality of keyboard keys; said computer entry system retrieving each such stored text data sequence upon receiving each such corresponding code name from said terminal device, and transmitting each such corresponding predetermined text data sequences to said computer system, comprising:

microprocessor means for controlling the operation of said computer entry system, random access read/write memory means coupled to said microprocessor means for storing said predetermined sequences of text data and said corresponding code names, read-only memory means coupled to said microprocessor means for storing a microprocessor control program;

a pair of receiver/transmitter devices coupled to said microprocessor means for interconnecting said microprocessor means with a serial data stream, power supply means for powering said microprocessor means, said memory means, and said receiver/transmitter devices and being coupled thereto; and, means for controlling said microprocessor means; said means for controlling stored in said read-only memory means for (1) receiving serial data from and transmitting serial data, comprising characters represented by any of said plurality of keyboard keys, to said computer system and said terminal device without modification thereof; (2) storing said predetermined text data sequences and said corresponding code names transmitted by said computer system in said read/write memory means, and; (3) retrieving said predetermined text data sequences from said read/write memory means in response to receipt of a first control code followed by, first said code names and then a second control code from said terminal device for transmission of said predetermined text data sequences to said computer system, upon which said operation of microprocessor means returns to said receiving serial data and said transmitting serial data without modification thereof.

* * * * *